United States Patent [19]

Bos

[11] 4,400,479
[45] Aug. 23, 1983

[54] PAINT ADAPTED FOR USE AS REPAIR PAINT FOR DAMAGED PAINTED SURFACES

[75] Inventor: Teunis M. Bos, Rotterdam, Netherlands

[73] Assignee: Akzo NV, Arnhem, Netherlands

[21] Appl. No.: 278,995

[22] Filed: Jun. 30, 1981

[30] Foreign Application Priority Data

Jul. 3, 1980 [NL] Netherlands ................... 8003847

[51] Int. Cl.$^3$ ................... C09D 3/81; C08L 1/10; C08L 1/16
[52] U.S. Cl. ........................... 524/38; 524/35; 524/37; 524/39; 524/40
[58] Field of Search ........... 260/16, 17 R, 17.4 CL, 260/13, 17.4 GC; 525/48, 365, ; 524/38, 35, 37, 39, 40

[56] References Cited

U.S. PATENT DOCUMENTS

| | | | |
|---|---|---|---|
| 2,069,983 | 2/1937 | Ubben | 260/16 |
| 2,407,479 | 9/1946 | D'Alelio | 525/48 |
| 2,849,409 | 8/1958 | Evans | 260/16 |
| 3,404,134 | 10/1968 | Rees | 525/365 |
| 3,940,353 | 2/1976 | Martorano | 260/22 CB |
| 4,089,994 | 5/1978 | Mattsson et al. | 427/140 |
| 4,120,835 | 10/1978 | Goodell | 260/15 |

*Primary Examiner*—John Kight, III
*Assistant Examiner*—Nathan M. Nutter
*Attorney, Agent, or Firm*—Stevens, Davis, Miller & Mosher

[57] ABSTRACT

A coating composition adapted for repairing a damaged coating on a substrate comprises as the binder a mixture of a polyacrylate, an acrylated alkyd resin and a cellulose ester which form 100 percent of the binder. The coating composition is particularly well suited for use in preparing damaged paint on a motor vehicle body. The binder may be mixed with a volatile inert organic solvent for the binder in making the composition. The composition has a higher solids content than composition usually used for repairing damaged coatings and much thicker layers of the coating composition may be applied. By mixing the components of the binder in the ratio of 10 to 60 parts by weight of polyacrylate to 30 to 75 parts by weight of acrylated alkyd resin and 5 to 45 parts by weight cellulose ester to form the binder a coating composition having reduced tendency to crack and of improved solids content is obtained.

15 Claims, No Drawings

PAINT ADAPTED FOR USE AS REPAIR PAINT FOR DAMAGED PAINTED SURFACES

The invention relates to a physically drying coating composition suitable for use to repair painted surfaces such as motor car body surfaces.

Known physically drying repair paints contain a thermoplastic polyacrylate, for instance polymethyl methacrylate, optionally mixed with a plasticizer and/or a cellulose ester as for example, the paint disclosed in U.S. Pat. No. 4,089,994. A disadvantage of these paints is that they exhibit poor body and low gloss, so that after the paint has dried, it must be polished. Another disadvantage is that after these paints have dried, they are sensitive to organic solvents. A further disadvantage is that because of their pronounced thermoplastic character the paints are susceptible to severe dirt collections under tropical weather conditions.

It is an object of the present invention to provide a paint for repairing damaged painted surfaces which not only shows none of the above-mentioned drawbacks, but possesses considerably improved application properties, such as excellent sprayability and very good levelling. Still another object of the invention is to provide such a coating composition which may have a higher solids content than similar prior art compositions, as a result of which thicker layers may be applied and a particular coating thickness is reached within a shorter time.

The foregoing objects and others are accomplished in accordance with this invention, generally speaking by providing a coating composition which contains as a binder 1. 10–60 parts by weight of a polyacrylate having an acid number of 0–15 and a weight average molecular weight in the range of from 10,000 to 60,000;

2. 30–75 parts by weight of an acrylated alkyd resin obtained by polymerization of a mixture of 20–80 percent by weight of an acrylate monomer and 80–20 percent by weight of an ethylenically unsaturated alkyd resin having a weight average molecular weight in the range of from 500 to 1500 and an iodine number in the range of from 20 to 70; and 3. 5–45 parts by weight of a cellulose ester,
the three basic components together forming 100 percent by weight of the binder. By a polyacrylate is to be understood here a copolymer of at least 2 compounds independently chosen from the group of acrylic acid, methacrylic acid (hereinafter referred to generally as acrylic acid) and a compound derived therefrom, such as a (cyclo)alkyl acrylate or a hydroxy(cyclo)alkyl acrylate of which the (cyclo)alkyl group has 1–16 carbon atoms and acrylonitrile; the polyacrylate may also contain compounds such as styrene, α-methyl styrene, vinyl acetate or vinyl toluene. Specific examples of suitable acrylic acid derivatives include: methyl acrylate, methyl methacrylate, hydroxyethyl acrylate, hydroxyethyl methacrylate, ethyl acrylate, ethyl methacrylate, hydroxypropyl acrylate, hydroxypropyl methacrylate, n-butyl acrylate, n-butyl methacrylate, isobutyl methacrylate, tert.butyl acrylate, hydroxybutyl acrylate, n-hexyl methacrylate, cyclohexyl acrylate, 2-ethylhexyl acrylate, 2-ethylhexyl methacrylate, dodecyl acrylate, hexadecyl acrylate and the like. It is preferred that as acrylate monomer an acrylic acid ester of an alcohol having 1 to 8 carbon atoms, for example, methyl methacrylate, ethyl methacrylate, butyl acrylate and/or 2-ethylhexyl acrylate should be used. The polyacrylate is built up from at least 50 percent by weight, preferably at least 65 percent by weight and more preferably at least 85 percent by weight of acrylic acid and/or a derivative thereof.

According to the invention the polyacrylate has an acid number in the range of from 0 to 15, preferably 0 to 10; the hydroxyl number may vary between wide limits, for instance between 0 and 35. The polyacrylate is preferably used in an amount of 20 to 35 parts by weight per 100 parts by weight of the 3 basic components.

According to this invention the acrylated alkyd resin is obtained by polymerization of a mixture of 20–80 percent by weight of an acrylate monomer and 80–20 percent by weight of a particular alkyd resin. As acrylate monomer there may be used one or more of the monomers which may be employed in the preparation of the polyacrylate described hereinbefore. It is preferred that as monomer methyl methacrylate, ethyl methacrylate, butyl methacrylate and/or acrylic acid should be used. The ethylenically unsaturated alkyd resin may be prepared by polycondensation of generally one or more aliphatic and/or cycloaliphatic and/or aromatic monovalent, divalent and/or polyvalent alcohols and one or more aliphatic, cycloaliphatic and/or aromatic monovalent, divalent or polyvalent carboxylic acids and/or derivatives thereof. Examples of suitable alcohols include lauryl alcohol, benzyl alcohol, cyclohexanol, ethylene glycol, propylene glycol, neopentyl glycol, hexane diol-1,6, 2,2-bis(4-hydroxycyclohexyl)-propane, 2,2-bis(p-phenyleneoxyethanol)-propane, 2,2-bis(p-phenyleneoxypropanol-2)-propane, diethylene glycol, glycerol, trimethylol ethane, trimethylol propane, pentaerythritol and/or dipentaerythritol and/or the corresponding epoxy compounds. It is preferred that use should be made of glycerol, trimethylol propane and/or pentaerythritol.

Any suitable di- or polyvalent carboxylic acid may be used such as, for example, maleic acid, fumaric acid, itaconic acid, citraconic acid, malonic acid, succinic acid, glutaric acid, adipic acid, azelaic acid, sebacis acid, tetrahydrophthalic acid, hexahydrophthalic acid, endomethylene tetrahydrophthalic acid, o-phthalic acid, dichlorophthalic acid, hexachloroendomethylene tetrahydrophthalic acid, isophthalic acid, terephthalic acid, trimellitic acid and/or pyromellitic acid. Optionally, the carboxylic acid may be employed in the form of an anhydride, for instance: maleic anhydride or phthalic anhydride. The preferred dicarboxylic acid is phthalic acid as its anhydride. Examples of suitable monovalent carboxylic acids include acrylic acid, benzoic acid and a fatty acid containing 5–18, preferably 7–18 carbon atoms such as valeric acid, heptanoic acid, 2-ethylhexanoic acid, pelargonic acid, isononanoic acid, lauric acid, coconut oil fatty acid, tall oil fatty acid, linoleic acid, linolenic acid, stearic acid and branched fatty acids having 18 carbon atoms. Linseed oil fatty acid, sunflower oil fatty acid and/or tall oil fatty acid are preferred. By preference, the alkyd resin should contain 5–30, more particularly 12–18 percent by weight of the fatty acid. Optionally, the fatty acid may be used in dimerized form.

The weight average molecular weight of the alkyd resin is preferably in the range of from 700 to 1300 and the iodine number is preferably in the range of from 35 to 55. The acid number of the alkyd resin is preferably not higher than 105, and more particularly in the range of from 10 to 60; the hydroxyl number may vary between wide limits, for instance between 0 and 200, preferably between 0 and 90.

The alkyd resin may be prepared in one or more steps in any convenient manner, for instance by the so-called solvent process, in which the water evolved in the reaction is removed azetropically with, for instance, an organic solvent such as toluene or xylene and subsequently the volatile constituents are generally removed to the desired extent in vacuo. If desired, however, the preparation also may be effected by the so-called melt process, in which the reaction takes place with evaporation of the reaction water in the absence of an organic solvent. Any suitable esterification catalyst may be used, for example: sulphuric acid, p-toluene sulphonic acid, benzene sulphonic acid, naphthalene sulphonic acid and metal compounds, such as dibutyl tin oxide and dibutyl tin dilaurate, or the like.

The preparation of the acrylated alkyd resin just as that of the polyacrylate, may be carried out in accordance with methods known in themselves using a free radical initiator at a temperature generally in the range of 80° to 180° C. in an organic solvent.

It is preferred that the acrylated alkyd resin should have an acid number in the range of from 4 to 21 and a weight average molecular weight in the range of from 7000 to 13,000, more particularly in the range of from 8500 to 11,000. It is preferred that the acrylated alkyd resin should be employed in an amount of 45–65 parts by weight per 100 parts by weight of the 3 basic components.

Examples of suitable cellulose esters include esters prepared by a process comprising the use of monocarboxylic acids containing 2 to 5 carbon atoms, such as acetic acid, propionic acid and butyric acid or, optionally, the anhydrides thereof. Use may, of course, also be made of cellulose esters having different carboxylic acid groups or physical mixtures of different cellulose esters. The cellulose esters generally to be used in actual practice as a rule also contain a small amount of hydroxyl, for instance a few percent by weight. It is preferred that use should be made of a cellulose acetobutyrate. The cellulose esters are preferably used in an amount of 10–25 parts by weight per 100 parts by weight of the 3 basic components.

The combination according to the present invention of the polyacrylate, the acrylated alkyd resin and the cellulose ester produces excellent coatings, particularly when the components are used in the preferred amounts by weight indicated. Furthermore, it is preferred that the weight ratio of the acrylated alkyd resin to the sum of the polyacrylate and the cellulose ester should be in the range of from 50:50 to 65:35. For further optimization of the composition, notably for use under exceptional climatological conditions with widely varying temperatures one or more special additions may still be incorporated in the composition, so that an extraordinarily good combination of flexibility, resistance to cracking and thermoplasticity may be obtained. As a result, collection of dirt on the painted surface, even in desert regions or in areas in which similar weather conditions prevail, will seldom occur if at all.

The above contemplated additives are (a) a plasticizer which is to be compatible with the polyacrylate and the acrylated alkyd resin and/or (b) an organic aluminum compound capable of forming a complex with the functional groups, if any, of the polyacrylate and the acrylated alkyd resin, optionally mixed with a monofunctional alcohol having 1–6 carbon atoms. However, it is not absolutely necessary for these two additions to be used together.

As examples of suitable plasticizers may be mentioned phthalate esters, phosphate esters and citrate esters. Representative examples thereof are dibutyl phthalate, dioctyl phthalate, butyl benzyl phthalate, tricresyl phosphate and tributyl citrate. It is preferred that use should be made of butyl benzyl phthalate. The plasticizer is generally employed in an amount of not more than 10 percent by weight, based on the binder.

Suitable organic aluminum compounds include compounds obtained by reacting aluminum alkoxides or aluminum oxyacylates with compounds such as tautomeric keto or enol compounds, for instance ethyl acetoacetate, acetyl acetone, dimethyl malonate; 1,3-propanediol derivatives, for instance: 1,3-propanediol, 1,1,1-trimethylol propane or 2,4-pentanediol; or with salicylic esters or salicylic aldehydes. This blocking reaction reduces the reactivity of the original organic aluminum compound so that after the aluminum compound has been added, there is no premature gelation of the binder, however, the final hardening of the binder containing the aluminum compound is not unduly retarded. The organic aluminum compounds described in, for instance, Netherlands patent application Nos. 7,304,347, 7,400,565 and 7,602,024 are preferred.

Netherlands patent application No. 7,304,347 pertains to compounds having the formula $(RO)_x AlA\ B_{2-x}$, wherein R is an alkyl group having 1–6 carbon atoms, or an aryl or cycloalkyl group, A and B, being the same or different, are groups, at least one of which exerts a steric hindrance to a higher degree than the Group RO, and x is zero, 1 and 2. The Groups A and B may preferably be selected from the class comprising (1) alkoxy, (2) alkyl sulphate, (3) aryl sulphonate, (4) dialkyl phosphate, (5) diaryl phosphate, (6) dialkyl phosphite, (7) diaryl phosphite, (8) carboxylic acid substituted or not, (9) dicarboxylic acid or a derivative thereof, (10) an alkyl, aryl or aryloxy phenol substituted or not, (11) a halogenated phenol, (12) a group derived from a heavily branched and weakly volatile alcohol, (13) a metal carboxylate, (14) an arloxy substituted or not, (15) a colophonium group and (16) a group having the formula OMA wherein M is a divalent metal group and A is a group having the above significance (O is naturally always oxygen).

Netherlands patent application No. 7,400,565 claims a mixture of (1) an aluminium compound containing at least an alkoxy group and (2) a labile monofunctional compound in excess. Component (2) is preferably an alcohol that may be branched or an alkoxy alcohol, more specifically an acetyl acetone or an acetyl-ethyl acetate in the enol form.

Netherlands patent application No. 7,602,024 refers to the combination of an aluminium alcoholate compound and either at least one mole of water, oxygen-containing water or an organic hydroperoxide or at least one mole of a mixture of a labile monofunctional reactant and water, oxygen-containing water or an organic hydroperoxide.

The organic aluminum compound is generally employed in an amount not higher than ½, preferably not higher than ¼ percent by weight (calculated as aluminum metal), based on the binder. When use is made of an organic aluminum compound, it is preferred that use should be made of a polyacrylate having an acid number not higher than 3 in order to prevent premature gelation of the binder.

Examples of suitable monofunctional alcohols with which the organic compound may be mixed include methanol, ethanol, propanol-2, butanol-2, 2-methylpropanol-2 and hexanol. The alcohol is usually employed in an amount not greater than 20 percent by weight, based on the binder.

Examples of other suitable additives include pigments, dispersing agents, levelling agents, thickening agents, dyes, fillers and organic solvents, and especially a volatile inert organic solvent substantially miscible with the binder.

In actual practice the coating composition is usually applied to the substrate by spraying, but it may of course also be applied by brush or in some other way. The coating composition applied is allowed to dry physically, usually at ambient temperature or at a slightly elevated temperature, generally up to not higher than 80° C.

In a repair paint system for motor vehicles the coating composition is generally applied to a substrate which has as a rule been pre-treated with, for instance, a wash primer and/or a spraying filler.

The invention is further described in the following examples, which constitute no limitation on the scope of the present invention. The gloss of the coatings listed in the examples is determined at 60 deg in accordance with Gardner and expressed in gloss units. A gloss value of 86 is to be regarded as good.

The thermoplasticity of the coatings is determined by scattering glass beads about 1 mm in diameter on the paint surface and subsequently placing the test panel in an oven in which it is exposed for 1 hour to a temperature of 60° or 80° C. Next, the coating surface is visually inspected for the degree to which the gloss beads stick to it and the impression they made in it.

The resistance to organic solvents is determined by applying one drop of premium grade petrol (gasoline) to the coated surface and leaving it to act on the coating for 5 minutes at 23° C., after which the remainder is removed. The coating is rated for softening, swelling and discoloration. The rating "very good" means that the coating has not softened. When the coating does not swell or discolor and slightly softens only temporarily (for 1 hour), the coating is rated "good". In the case of slight, irreversible swelling of the coating, its resistance is rated "sufficient".

Resistance to cracking of paint under the influence of changes in temperature is determined by exposing the test panels, successively to a temperature of +60° C., −20° C., and +60° C. and −20° C., each time for a period of 2 hours, and finally to a temperature of 23° C. for 16 hours. After 4, 10 or 15 of these cycles the coating is inspected for the formation of cracks.

The hardness (Persoz) is determined in accordance with ISO standard 1522 and expressed in seconds.

For all these evaluations of the coatings the paints are sprayed in a layer thickness of about 50 m (in the dry state) onto steel panels pre-treated with a wash primer based on polyvinyl butyral, zinc tetraoxychromate and phosphoric acid. The compositions brought to spraying consistency with an organic solvent all have a viscosity of 13 seconds efflux time measured with a DIN Cup No. 4 at a temperature of 23° C. As solvent there is used a mixture made up of equal parts by weight of xylene, ethyl acetate and ethyl glycol acetate.

In the examples mixtures are tested, in the parts by weight indicated, of polyacrylates, acrylated alkyd resins, cellulose acetobutyrates and, in a number of cases, butyl benzylphthalate as plasticizer, an organic aluminum compound and a monofunctional alcohol, as stated in the accompanying tables.

The polyacrylate A is a copolymer of 89 parts by weight of methyl methacrylate, 10 parts by weight of ethyl methacrylate and 1 part by weight of acrylic acid. The polyacrylate B is a copolymer of 74 parts by weight of methyl methacrylate, 25 parts by weight of ethyl acrylate and 1 part by weight of acrylic acid. The weight average molecular weight of either of the polymers is in the order of 30,000, and the acid number is 8 and 7, respectively. Both polyacrylates are used as a 40%-by weight solution in toluene.

The letters in the table under the heading "Polyacrylate" identify the polyacrylate was used; the numbers denote the parts by weight of the individual polyacrylates.

The acrylated alkyd resin A is built up from 49.8 parts by weight of methyl methacrylate, 4.2 parts by weight of ethyl methacrylate, 5.4 parts by weight of butyl methacrylate, 0.6 parts by weight of acrylic acid and 40 parts by weight of an alkyd resin having an iodine number of 46 and prepared from 7.3 parts by weight of linseed oil fatty acid, 7.3 parts by weight of a dimeric fatty acid (marketed by Unilever under the trade name Unilever 6550). 2.2 parts by weight of glycerol, 6.7 parts by weight of pentaerythritol, 7.6 parts by weight of phthalic anhydride and 8.9 parts by weight of benzoic acid. The acrylated alkyd resin B is built up from 53.4 parts by weight of methyl methacrylate, 6 parts by weight of ethyl methacrylate and 0.6 part by weight of methacrylic acid, the alkyd resin being the same as that of the A resin. The weight average molecular weight of the acrylated resin is about 9600 and 9200, respectively, and the acid number is 9.2 and 8.9, respectively. The acrylated resins are used as a 50% by weight solution in xylene. The letters in the table under the heading "Acrylated alkyd resin" indicate which resin was used; the numbers are parts by weight of the individual resins.

As cellulose ester a cellulose aceto-butyrate having an average butyrate content of 53% by weight, an average acetate content of 2% by weight and an average hydroxyl content of 1.6% by weight is used; the viscosity is 0.2 second, measured in accordance with ASTM D 1343. The organic aluminum compound has the formula $$(Al(C_2H_5O(CH_2)_2O)_2(CH_3COCH_2COO)$$

and is additionally stabilized with ethoxy ethanol (marketed by Manchem under the trade name Alusec 510).

EXAMPLES I–VIII

In these examples mixtures of the polyacrylates, acrylated alkyd resins and cellulose acetobutyrate given in Table 1 and in the amounts listed therein are pigmented with a rutile titanium dioxide (marketed by BTP under the trade name Tioxyde R-CR2) in a weight ratio of binder to pigment of 1:1. The composition is adjusted to spraying consistency. The test results obtained are also listed in Table 1.

For comparison, the starting compounds are mixed in a ratio indicated in Table 1, which is outside the scope of the present invention, and pigmented and tested in the same way as in the preceding examples. It appears that the cracking level is unacceptably high and the solids content is unduly low in 2 cases (see the Comparitive Examples A, B and C).

TABLE 1

| Example | Weight Percentages polyacrylate | acrylate alkyd resin | cellulose ester | Solids content | Gloss | Thermoplasticity at 60° C. | Resistance to petrol | Cracking after 4 cycles | Cracking after 10 cycles |
| --- | --- | --- | --- | --- | --- | --- | --- | --- | --- |
| I | A-40.0 | A-40.0 | 20.0 | 23.5 | 85° | good | good | none | yes |
| II | B-26.1 | B-60.9 | 13.0 | 28.5 | 89° | sufficient | sufficient | none | none |
| III | B-23.1 | A-53.8 | 23.1 | 25.8 | 87° | good | good | none | none |
| IV | B-41.4 | A-48.3 | 10.3 | 24.9 | 86° | good | good | none | none |
| V | B-37.5 | B-43.8 | 18.7 | 23.8 | 85° | good | good | none | yes |
| VI | A-25.0 | B-50.0 | 25.0 | 24.1 | 86° | sufficient | sufficient | none | none |
| VII | A-20.0 | A-40.0 | 40.0 | 21.2 | 83° | good | good | none | none |
| VIII | A-13.0 | B-60.9 | 26.1 | 26.0 | 88° | sufficient | sufficient | none | none |
| Comparative examples | | | | | | | | | |
| A | A-28.5 | B-28.5 | 43 | 20.2 | 81° | good | excellent | yes | — |
| B | A-57.1 | B-28.6 | 22.1 | 22.1 | 84° | excellent | very good | yes | — |
| C | A-50.0 | B-25.0 | 25.0 | 19.2 | 80° | excellent | very good | yes | — |

EXAMPLES IX–XII

In these examples compositions are prepared from 15 parts by weight of polyacrylate A, 15 parts by weight of polyacrylate B, 36 parts by weight of acrylated alkyd resin A and 24 parts by weight of acrylated alkyd resin B, together with cellulose acetobutyrate (CAB) and butyl benzyl phthalate (BBF) in Table 2.

TABLE 2

| Example | Parts by Weight CAB | Parts by Weight BBF |
| --- | --- | --- |
| IX | 10 | 0 |
| X | 20 | 4 |
| XI | 10 | 4 |
| XII | 20 | 4 |

The compositions are subsequently pigmented and tested in accordance with the preceding examples. The test results are summarized in Table 3.

TABLE 3

| Example | polyacrylate A | polyacrylate B | acrylated alkyd resin A | acrylated alkyd resin B | CAB | BBF | Gloss | Hardness | Thermoplasticity at 60° C. | Resistance to petrol | Cracking after 10 cycles | Cracking after 15 cycles |
| --- | --- | --- | --- | --- | --- | --- | --- | --- | --- | --- | --- | --- |
| IX | 15 | 15 | 36 | 24 | 10 | 0 | 91 | 61 | very good | good | none | yes |
| X | 13.6 | 13.6 | 32.8 | 21.8 | 18.2 | 0 | 86 | 75 | excellent | good | none | yes |
| XI | 14.4 | 14.4 | 34.6 | 23.1 | 9.6 | 3.9 | 92 | 50 | sufficient | sufficient | none | none |
| XII | 13.2 | 13.2 | 31.6 | 21.1 | 17.6 | 3.5 | 87 | 65 | good | sufficient | none | none |

EXAMPLES XIII–XX

In these examples mixtures are prepared from 33 weight percent of a polyacrylate A in which methyl methacrylate has been replaced with methacrylic acid to the extent that the resulting product has the acid number given in Table 4, 67 parts weight percent of acrylated alkyd resin B in the preparation of which acrylic acid has been employed in an amount such that the resulting product has the acid number given in Table 4, to which there has still been added the aluminum compound in an amount by weight expressed as a percentage of aluminum based on solid binder. The mixtures are pigmented and tested in accordance with the procedure used in the preceding examples. The test results are summarized in Table 4. Determinative of storage stability is the time the resulting product can be kept in a closed tin at a temperature of 23° C. without being subject to essential changes.

TABLE 4

| Example | Acid number polyacrylate | Acid number acrylated alkyd | Parts by weight of alcohol | Wt. % aluminum component | Storage stability | Thermoplasticity at 60° C. | Thermoplasticity at 80° C. |
| --- | --- | --- | --- | --- | --- | --- | --- |
| XIII | 0 | 9 | 4 | 0.5 | >6 months | good | good |
| XIV | 1 | 9 | 4 | 0.5 | >6 months | good | good |
| XV | 1 | 15 | 4 | 0.5 | >6 months | good | good |
| XVI | 1 | 21 | 4 | 0.5 | >6 months | good | good |
| XVII | 1 | 9 | 0 | 0.5 | 3–6 months | good | good |
| XVIII | 1 | 9 | 4 | 0 | >6 months | good | deficient |
| XIX | 2 | 9 | 4 | 0.5 | 1 day | good | good |
| XX | 3 | 9 | 4 | 0.5 | 1 hour | good | good |

Although the invention has been described in detail for the purpose of illustration, it is to be understood that such detail is solely for that purpose and that variations can be made therein by those skilled in the art without departing from the spirit and scope of the invention except as it is limited by the claims.

What is claimed is:

1. A coating composition adapted for repairing a damaged coating on a substrate comprising 1. 10–60 parts by weight of a polyacrylate having an acid number of 0–15 and a weight average molecular weight in the range of from 10,000 to 60,000,
2. 30–75 parts by weight of an acrylated alkyd resin having an acid number in the range of from 4 to 21 and a weight average molecular weight in the range of from 7,000 to 13,000, and obtained by polymerization of a mixture of 20–80 percent by weight of an acrylate monomer and 80–20 percent by weight of an ethylenically unsaturated alkyd resin having a weight average molecular weight in the range of from 500 to 1,500 and an iodine number in the range of from 20 to 70, and
3. 5–45 parts by weight of a cellulose ester, the three basic components together forming 100 parts by weight of the binder; and
4. A volatile inert organic solvent for 1, 2, and 3.

2. A coating composition according to claim 1, characterized in that the polyacrylate is at least 50 percent by weight moieties derived from acrylic acid or a derivative thereof.

3. A coating composition according to claim 1, characterized in that the polyacrylate is derived from methyl methacrylate, ethyl methacrylate or butyl acrylate.

4. A coating composition according to claim 1 or 2, characterized in that the polyacrylate has an acid number in the range of from 0 to 10.

5. A coating composition according to claim 1 or 2, characterized in that per 100 parts by weight the binder contains 20 to 35 parts by weight of the polyacrylate.

6. A coating composition according to claim 1, wherein the acrylated alkyd resin is obtained by polymerization of a mixture of methyl methacrylate, ethyl methacrylate, butyl methacrylate or acrylic acid and an ethylenically unsaturated alkyd resin.

7. A coating composition according to claim 6, characterized in that per 100 parts by weight the binder contains 45 to 65 parts by weight of the acrylated alkyd resin.

8. A coating composition according to claim 1, characterized in that the cellulose ester is a cellulose acetobutyrate.

9. A coating composition according to claim 1, characterized in that per 100 parts by weight the binder contains 10 to 25 parts by weight of the cellulose ester.

10. A coating composition according to claim 1, characterized in that the weight ratio of the acrylated alkyd resin to the sum of the polyacrylate and the cellulose ester is in the range of from 50:50 to 65:35.

11. A coating composition according to claim 1, 2, 6, 8, 9 or 10 containing a plasticizer which is compatible with the polyacrylate and the acrylated alkyd resin.

12. A coating composition according to claim 11, characterized in that the plasticizer is butyl benzyl phthalate.

13. A coating composition according to claim 1, 2, 6, 8, 9 or 10, characterized in that the plasticizer is present in an amount of not more than 10 percent by weight, based on the weight of the binder.

14. A coating composition according to claim 1, 2, 6, 8, 9 or 10 containing an organic aluminum compound capable of forming a complex with functional groups, of the polyacrylate and the acrylated alkyd resin.

15. A coating composition containing a binder having the composition of claim 1, 2, 6, 8, 9 or 10 dissolved in a volatile inert organic solvent substantially miscible with the binder.

* * * * *